(12) United States Patent
Yu et al.

(10) Patent No.: US 12,743,589 B1
(45) Date of Patent: Sep. 22, 2026

(54) RETRIEVAL AND EDIT-BASED MACHINE TRANSLATION

(71) Applicant: Amazon Technologies, Inc., Seattle, WA (US)

(72) Inventors: Zhou Yu, Seattle, WA (US); Yi Liu, Seattle, WA (US); Simi Wang, Bellevue, WA (US); Junnosuke Kuroda, Redmond, WA (US); Girish Subramanian, Redmond, WA (US); Yonggang Deng, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 274 days.

(21) Appl. No.: 17/845,823

(22) Filed: Jun. 21, 2022

(51) Int. Cl.
*G06F 17/28* (2006.01)
*G06F 40/221* (2020.01)
*G06F 40/47* (2020.01)

(52) U.S. Cl.
CPC ............ *G06F 40/47* (2020.01); *G06F 40/221* (2020.01)

(58) Field of Classification Search
CPC .......... G06F 40/58; G06F 40/42; G06F 40/47; G06F 40/221; G06F 40/49; G06F 40/40; G06F 40/194; G06F 18/22; G06F 40/44; G06F 40/45; G10L 15/26; G06N 3/044; G06N 3/08; G06N 20/00; G06N 5/022
See application file for complete search history.

(56) References Cited

U.S. PATENT DOCUMENTS

2008/0154577 A1* 6/2008 Kim ........................ G06F 40/45 704/5
2014/0288915 A1* 9/2014 Madnani ................ G06F 40/58 704/2
2017/0083510 A1* 3/2017 Dixon ..................... G06F 40/44
2019/0155909 A1* 5/2019 Na .......................... G06F 40/58
2019/0205372 A1* 7/2019 Li ......................... G06F 40/232
2019/0251174 A1* 8/2019 Lee ......................... G06F 40/51
2019/0266248 A1* 8/2019 Tanaka ................ G06F 16/9577
2020/0210529 A1* 7/2020 Kong .................... G06F 40/295
2020/0285706 A1* 9/2020 Singh ....................... G06N 3/08
2020/0372115 A1* 11/2020 Liu ......................... G06F 40/58
2021/0097242 A1* 4/2021 Yoon ....................... G06F 40/47
2023/0048742 A1* 2/2023 Mishra ............. G06V 30/19093

OTHER PUBLICATIONS

Johnson et al.; Billion-scale Similarity Search with GPUs; Arxiv; Feb. 28, 2017; 12 pgs; Cornell University.
Feng et al.; Language-agnostic BERT Sentence Embedding; Arxiv; Mar. 8, 2022; 14 pgs; Cornell University.

* cited by examiner

*Primary Examiner* — Michael Ortiz-Sanchez
(74) *Attorney, Agent, or Firm* — K&L Gates LLP

(57) ABSTRACT

Devices and techniques are generally described for machine translation. In various examples, first text in a first spoken language may be received. A first candidate translation of the first text in a second spoken language may be determined based at least in part on the first text from among a candidate pool of non-translated text associated with a first domain. Combined data representing the first text and the first candidate translation may be generated. A first machine learning model may generate second text by modifying at least one word of the first candidate translation. The second text representing a machine translation of the first text may be output.

20 Claims, 9 Drawing Sheets

102

Source sentence: s "You can return three items in one box"

104

Transformer model 106

Output: t "1つの箱に3つのアイテムを返すことができます"

108

Algorithm 1: editor model training stage

```
  Input: Retriever: ψ
  Embedding function for the retriever: Φ_Labse
  Output: editor: θ' →
  Data: General domain bitext corpus: D
1 for (s, t) in D do
2 |  Retrieve t' = ψ(s), s.t.
  |    t' = argmax_{t*} sim (Φ_Labse(s), Φ_Labse(t*)) ((s*. t*) ϵD and s* ≠ ŝ)
3 |  if sim(Φ_Labse(s), Φ_Labse(t')) > threshold then
4 |    add (s[sep]t',t) do D'
5 |  else
6 |    add (s, t) to D'
7 Train editor θ' → on D'
```

Algorithm 2: Retrieve-rewrite inference stage

```
  Input: Retriever: ψ
  Embedding function for the retriever: Φ_Labse
  Editor θ' →
  Source sentence: s
  Output: Translation: t
  Data: In-domain monolingual data in target language: T
1 Retrieve t' = ψ(s), s.t. t' = argmax_{t*} sim (Φ_Labse(s), Φ_Labse(t*)) (t*ϵT)
2 if sim(Φ_Labse(s), Φ_Labse(t')) > threshold then
3   t = θ' → (s[sep]t')
4 else
5   t = θ' → (s)
```

FIG. 2

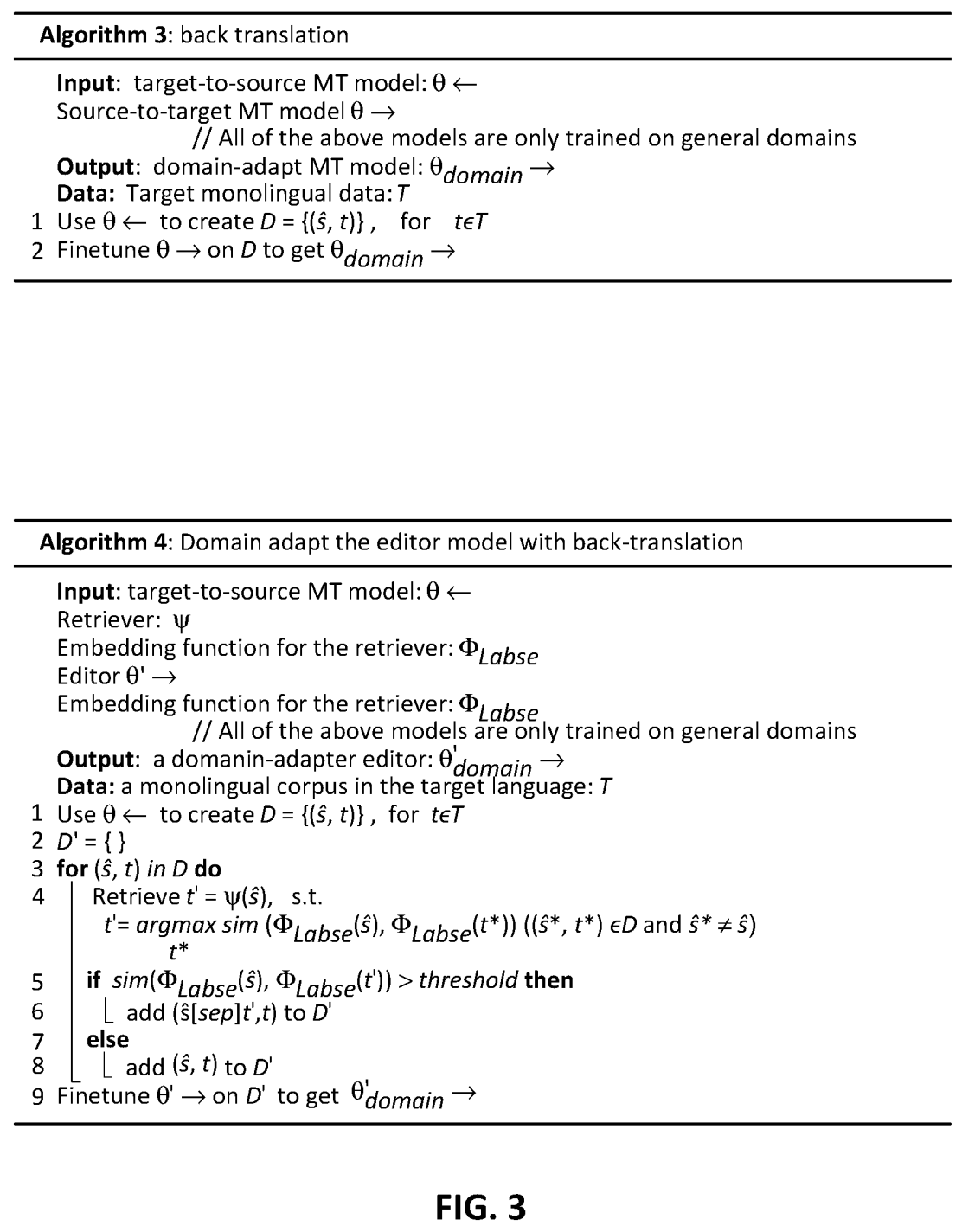

Algorithm 3: back translation

Input: target-to-source MT model: $\theta \leftarrow$
Source-to-target MT model $\theta \rightarrow$
// All of the above models are only trained on general domains
Output: domain-adapt MT model: $\theta_{domain} \rightarrow$
Data: Target monolingual data: $T$
1 Use $\theta \leftarrow$ to create $D = \{(\hat{s}, t)\}$, for $t \epsilon T$
2 Finetune $\theta \rightarrow$ on $D$ to get $\theta_{domain} \rightarrow$

Algorithm 4: Domain adapt the editor model with back-translation

Input: target-to-source MT model: $\theta \leftarrow$
Retriever: $\psi$
Embedding function for the retriever: $\Phi_{Labse}$
Editor $\theta' \rightarrow$
Embedding function for the retriever: $\Phi_{Labse}$
// All of the above models are only trained on general domains
Output: a domanin-adapter editor: $\theta'_{domain} \rightarrow$
Data: a monolingual corpus in the target language: $T$
1 Use $\theta \leftarrow$ to create $D = \{(\hat{s}, t)\}$, for $t \epsilon T$
2 $D' = \{\ \}$
3 for $(\hat{s}, t)$ *in* $D$ do
4 Retrieve $t' = \psi(\hat{s})$, s.t. $t' = \underset{t^*}{argmax}\ sim\ (\Phi_{Labse}(\hat{s}), \Phi_{Labse}(t^*))\ ((\hat{s}^*, t^*)\ \epsilon D$ and $\hat{s}^* \neq \hat{s})$
5 if $sim(\Phi_{Labse}(\hat{s}), \Phi_{Labse}(t')) > threshold$ then
6 add $(\hat{s}[sep]t', t)$ to $D'$
7 else
8 add $(\hat{s}, t)$ to $D'$
9 Finetune $\theta' \rightarrow$ on $D'$ to get $\theta'_{domain} \rightarrow$

FIG. 3

Algorithm 5: Domain adapted reranker training stage

Input: target-to-source MT model: $\theta \leftarrow$
Retriever: $\psi$
Embedding function for the retriever: $\Phi_{Labse}$
// All of the above models are only trained on general domains
Output: a domanin-adapted embedding function for reranking: $\Phi_{domain}$
Data: a monolingual corpus in the target language: $T$

```
1  Use θ← to create D = {(ŝ, t)}, for t∈T
2  D' = { }
3  for (ŝ, t) in D do
4  |  Retrieve top-k t'_i (i = 1,2,...,k), using ψ(ŝ), s.t.
   |    sim(Φ_Labse(ŝ), Φ_Labse(t'_i)) >
   |    sim(Φ_Labse(ŝ), Φ_Labse(t*)) ((ŝ*, t*)∈D and ŝ* ≠ ŝ, and t* ∉
   |    (t'_1, t'_2, ..., t'_k))
5  |  Randomly select t'_a and t'_b from (t'_1, t'_2, ..., t'_k))
6  |  if ChrF(t'_a) > ChrF(t'_b) then
7  |    add (ŝ, t'_a, t'_b) to D'
8  |  else
9  |    add (ŝ, t'_a, t'_b) to D'
10 Train Φ_domain, to minimize loss:
     L = Σ max(sim(φ_domain(ŝ), Φ_domain(t_neg')) -
     sim(Φdomain(ŝ), Φ_domain(t_pos')) + margin, 0), (ŝ, t_pos', t_neg')∈D'
```

$$L = \sum \max(sim(\phi_{domain}(\hat{s}), \Phi_{domain}(t_{neg}')) - sim(\Phi domain(\hat{s}), \Phi_{domain}(t_{pos}')) + margin, 0), (\hat{s}, t_{pos}', t_{neg}') \in D'$$

FIG. 4

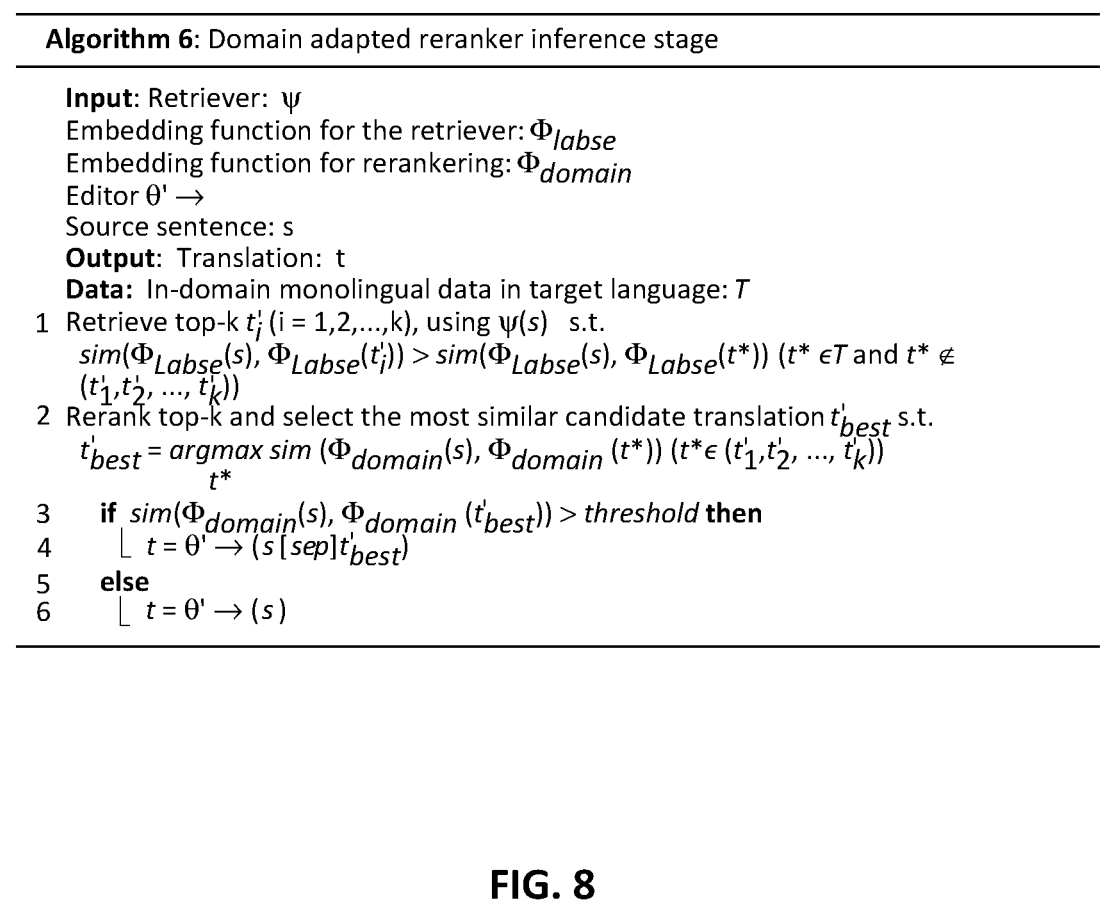

Algorithm 6: Domain adapted reranker inference stage

Input: Retriever: $\psi$
Embedding function for the retriever: $\Phi_{labse}$
Embedding function for rerankering: $\Phi_{domain}$
Editor $\theta' \rightarrow$
Source sentence: s
Output: Translation: t
Data: In-domain monolingual data in target language: $T$ 1 Retrieve top-k $t_i'$ (i = 1,2,...,k), using $\psi(s)$ s.t. $sim(\Phi_{Labse}(s), \Phi_{Labse}(t_i')) > sim(\Phi_{Labse}(s), \Phi_{Labse}(t^*))$ ($t^* \in T$ and $t^* \notin (t_1', t_2', ..., t_k')$)
2 Rerank top-k and select the most similar candidate translation $t_{best}'$ s.t. $t_{best}' = \underset{t^*}{argmax}\ sim\ (\Phi_{domain}(s), \Phi_{domain}(t^*))$ ($t^* \in (t_1', t_2', ..., t_k')$)
3 if $sim(\Phi_{domain}(s), \Phi_{domain}(t_{best}')) > threshold$ then
4 $t = \theta' \rightarrow (s\,[sep]\,t_{best}')$
5 else
6 $t = \theta' \rightarrow (s)$

FIG. 8

RETRIEVAL AND EDIT-BASED MACHINE TRANSLATION

BACKGROUND

Machine translation involves the use of computers to translate text and/or speech from one language to another. Simple replacement of one word with a corresponding word in the target language rarely generates a high quality translation as semantic and contextual information is often lost. In addition, many words do not have direct equivalents in the target language and/or have different connotations. Accordingly, machine translation systems that consider the meaning of the entire sentence/phrase/segment often product higher quality translations relative to simple word-for-word substitutions.

BRIEF DESCRIPTION OF DRAWINGS

FIG. 2 depicts two algorithms that may be used by the neural machine translation system of FIG. 1B, in accordance with various embodiments of the present disclosure.

FIG. 3 depicts another two algorithms that may be used by the neural machine translation system of FIG. 1B, in accordance with various embodiments of the present disclosure.

FIG. 4 depicts another algorithm that may be used by the neural machine translation system of FIG. 1B, in accordance with various embodiments of the present disclosure.

FIG. 8 depicts another algorithm that may be used by the neural machine translation system of FIG. 1B, in accordance with various aspects of the present disclosure.

DETAILED DESCRIPTION

Figures 1A, 1B:
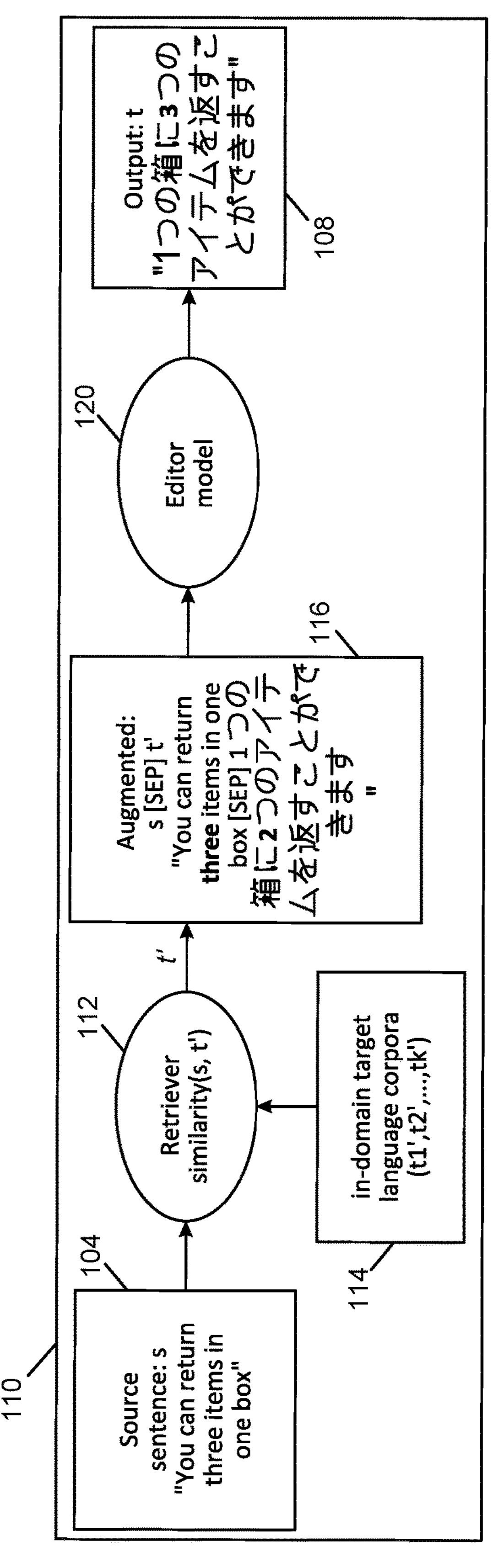
FIG. 1A is a block diagram illustrating a computer-implemented translation system, according to various embodiments of the present disclosure.
FIG. 1B is a block diagram illustrating another example of a neural machine translation system that may be used in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Neural machine translation (NMT) is the process of translating an input text sequence composed in one language (the "source" or input text) into an output language (the "target" language) using a neural network. In this context, language (sometimes referred to as "spoken language") is understood to mean a natural language as used by humans for communication, such as English, French, Czech, etc. An example of NMT would be translating a news article from French into English via a neural network running on one or more computing devices.

One of the advantages of NMT is that it can provide a high quality translation quickly (on the order of seconds or less) without any human input or supervision. Current examples of NMT systems include Google Translate and Amazon Translate. However, NMT may be used in other contexts as well. For example, online customer service may use NMT so that technical experts may answer technical questions in a variety of different languages without needing fluent speakers in each spoken language who are also technical experts. NMT models are often trained using millions (e.g., tens of millions) of web-crawled general domain (e.g., non-domain specific) sentence pairs. A sentence pair may be a sentence in a source language and the same sentence in the target language. Such sentence pairs are often referred to as "bitext."

NMT models trained on general domain bitext often show degraded performance for translation in a specific domain. A domain refers to a specific and/or specialized language topic. For example, computer science may be a first domain, while music may be a different domain. Each of these domains may use specialized terms that do not typically appear outside of that domain. Thus, individual domains may include terms, phrases, and/or sentences that tend to be underrepresented in a given generic training corpus (e.g., a web-crawled corpus of bitext that is non-domain specific). Domain-specific performance may be improved by fine-tuning the core NMT model with substantial high-quality translated sentence pairs from underrepresented domains and/or from the domain of interest. However, the fine-tuning method is not efficient or scalable for a few reasons. First, high quality annotated data are expensive to obtain as they require language specialists who are also trained with domain knowledge (e.g., a person speaking fluent French and English who is also well versed in computer science terminology for the computer science domain). Second, expert annotations take time to generate in sufficient volume. For example, a well-trained specialist may be able to output 70 translations per day. As such, it may take ~72 working days for a single specialist to generate 5000 translated sentences of bitext, which is the minimal required number to fine-tune a NMT model to get a testable improvement (typically with ~50,000 translated sentences being required for significant improvement). Third, patterns may be overlooked given the usually limited size of tagged bitext data. Fourth, human-based tagging prevents automatic-scaling with respect to emerging language patterns.

As used herein, bitext refers to paired sentences in the source and target language which are translations of each other. "Target language" and "target sentence" refers, respectively, to language and sentences in the target language (e.g., the "translate to" spoken language), while "source language" and "source sentence" refers, respectively, to language and sentences in the source language (e.g., the "translate from" spoken language). A "general domain" or "non-specific domain" refers to a mix of language data that comes from various sources (e.g., web crawl, Wikipedia, public news sources, etc.). A general domain corpus is typically used to train a generic translation model (e.g., an NMT model). Generally, "sentences" may be referred to herein in the context of NMT translation. However, the techniques are more generally applicable to any quantum of natural language (e.g., words, paragraphs, etc.).

Nevertheless, the term "sentence" is often used herein for brevity and ease of illustration.

Described herein are various systems and techniques that may be used for retrieve- and edit-based machine translation that remedy the technical challenges described above. In various examples, a candidate translation for source text/source language is first retrieved. The candidate translation is retrieved from an existing target language dataset that may be domain-specific (to the domain of interest). The candidate translation is selected to have a similar semantic meaning to the source sentence. The candidate translation is combined with the input source sentence and is sent to an editor machine learning model that finalizes the translation by editing (e.g., modifying) the candidate translation in the target language to generate an accurate translation of the source sentence. The systems and techniques described herein do not require domain-of-interest bitext, but may instead use a corpus of domain-specific text in the target language as a corpus from which candidate translations may be retrieved. These candidate translations may then be modified (e.g., by altering one or more words such as through modification, substitution, deletion, addition, etc.) to generate an accurate translation of the input source sentence (e.g., a corrected translation generated from the retrieved candidate translation).

Machine learning techniques, such as those described herein, are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation. In various examples, the neural networks described herein for machine translation are deterministic.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Generally, in machine learning, an embedding (or "embedding data") is a mapping of a discrete, categorical variable to a vector of continuous numbers. In various examples, token embeddings (e.g., token data) may be generated to represent various text described herein for input into the various machine learning models described herein.

FIG. 1A is a block diagram illustrating a conventional neural machine translation system 102. As previously described, if the transformer model 106 (or other machine learning model trained for the language translation task) is provided with a sufficient amount of bitext data, the transformer model 106 may successfully perform the translation task. Specifically, given the source sentence 104 in the source language (English), the transformer model 106 is able to generate output 108 in the target language (Japanese). In various examples, many current machine translation models are implemented as transformer-based models. Such models are usually trained on 10-100 million sentence pairs (bitext) from general domains (web crawls, wiki pages, news, and other public data sources) and fine-tuned on domain specific high quality data that are translated by language specialists who have both domain knowledge and language expertise. As discussed above, this approach is not scalable for domain specific machine translation adaptation.

FIG. 1B is a block diagram illustrating another example of a neural translation system 110 that may overcome the limitations described above with respect to traditional domain-specific NMT tasks. Given a source sentence s 104 in English, a candidate translation t' is retrieved by retriever 112 from an in-domain target language corpora 114. The in-domain target language corpora 114 are natural language sentences in the target language t that are in the domain of interest (e.g., music, computer science, basketball, etc.). Specific domains often use specialized and/or esoteric language that is domain-specific. Accordingly, an NMT system such as that shown in FIG. 1A that is trained using a general corpus of bitext may not generalize well in domain-specific contexts. In the neural translation system 110, the assumption is that only minor editing is required to modify the candidate translation t' to generate the desired translation t in the target language, as language in the same domain often is more homogeneous. For example, most conversations in a customer service domain may focus on a few select issues and/or problems.

Although not specifically shown in FIG. 1B, the neural translation system 110 may be implemented using one or more computing devices. The computing device(s) may include and/or be in communication with non-transitory computer-readable memory, such as over a computer communication network. For example, the computing device(s) implementing the neural translation system 110 may be in communication with one another and/or with non-transitory computer-readable memory over local area network (LAN) and/or a wide area network (WAN) such as the internet.

A candidate translation t' that has sufficient similarity to the source sentence s is retrieved by retriever 112. t' is combined with the source sentence s to augment s. The resulting augmented input 116 (e.g., combined data representing a concatenation of the source s and the candidate sentence t' (s [SEP] t'), where [SEP] is a special token to denote the separation of the two segments), is sent to an editor model 120 to generate the correct translation t by altering a few words of the candidate translation t'. In the example shown in FIG. 1B, the candidate translation Japanese sentence t' is very similar to the source except for the difference in the quantity (the "2" in the Japanese candidate translation should be "3" in the correct translation). The editor model 120 corrects the quantity term (replacing "2" with "3") and generates output 108 (e.g., the final translation t).

The neural translation system 110 uses an in-domain monolingual corpus in the target language (e.g., in-domain target language corpora 114). The in-domain target language corpora 114 may be untranslated text and may represent a candidate pool of in-domain text in the target language. The retriever 112 is used to identify a candidate translation t' that is semantically similar to the source sentence. The retriever uses a similarity search in the Faiss framework (J. Johnson, M. Douze, and H. Jégou. *Billion-scale similarity search with gpus. arXiv preprint arXiv:*1702.08734, 2017) using cross-lingual sentence transformer embeddings (e.g., cross lingual embedding vectors such as those described in F. Feng, Y. Yang, D. Cer, N. Arivazhagan, and W. Wang. *Language-agnostic bert sentence embedding,* 2020).

The editor model 120 may be a transformer that may be trained as shown in Algorithm 1 (FIG. 2). Algorithm 1 uses general domain bitext data and thus does not require in-domain bitext human labeling. During training, the retriever 112 is applied to retrieve candidate translations t' for the source sentence s. The ground truth translation from the bitext training data is excluded from being retrieved as a candidate translation t' during training. The candidate translations t' are input into editor model 120. The output translations t are compared to the ground truth translations from the bitext data and the resulting loss is used to train the editor model 120 to make the appropriate modifications to the candidate translations t' to generate correct translations t.

Algorithm 2 describes the inference operations of the neural translation system 110. When translation in a specific domain is needed, the editor model 120 does not have to be fine-tuned using in-domain human-annotated data. Instead, a pool of sentences that are in the target language and target domain (e.g., untranslated sentences) may be used as the in-domain target language corpora 114. The editor model 120 outputs translations based on editing (e.g., modifying) the most semantically-similar candidate translations from the in-domain target language corpora 114. The resulting translations t are high quality and fit the style/requirement of the desired domain as they are edited directly from in-domain sentences.

A symbol table for the Algorithms shown in the figures is provided below.

TABLE 1

Symbol table

| Symbol | Explanation |
| --- | --- |
| $\Psi$ | Retriever: retrieve top candidate translation(s) based on embedding similarities |
| $\Phi_{Labse}$ | Embedding function for the retriever[3] |
| $\Phi_{domain}$ | Domain adapted embedding function for reranking |
| sim | Embedding cosine similarity (or other similarity metric) |
| ChrF | Character n-gram F-score |
| $\theta \rightarrow$ | Source language - > target language MT model (arrow indicates the direction of translation |
| $\theta \leftarrow$ | Target language - > source language MT model |
| $\theta_{domain} \rightarrow$ | source- > target domain adapted MT model |
| $\theta' \rightarrow$ | Editor model (input: source w/ wo. Candidate translation; output: final translation) |
| $\theta'_{domain} \rightarrow$ | Domain adapted editor model |

When applying the neural translation system 110 for on-the-fly domain adaptation, the in-domain monolingual corpora may be directly used as the in-domain target language corpora 114 for retrieving, while the editor model 120 and retriever 112 components may be trained using only the generic corpus (as described above). However, the editor model 120 may be improved through data augmentation using back-translation as described herein. Back-translation may be used to generate augmented bitext training samples by back-translating the in-domain target language corpora t' to generate pseudo-source sentences (thereby generating automatically generated bitext). Back-translation is described in Algorithm 3. The pseudo-source sentences may be used to train the editor model 120, as described above. In other words, the pseudo-source sentences may be input into the neural translation system 110 to retrieve candidate translations t' (excluding the ground truth candidate translation that was used to generate the pseudo-source sentence). The retrieved candidate translations t' may be input into the editor model 120 and the ground truth candidate translation may be used to determine loss and train the editor model 120. In this way, the training data for the editor model 120 may be augmented. Algorithm 4 describes use of reverse direction machine translation.

The major differences between the initial editor model 120 training stage algorithm (Algorithm 1) and the back-translation enabled editor fine-tuning algorithm (Algorithm 4) are that, in Algorithm 4, D is created through back-translation instead of human-labeled bitext. Additionally, in Algorithm 4, the editor model is fine-tuning on D' (augmented with the retriever 112 on D) instead of training from scratch.

In various other retrieve-edit frameworks, the retrieval of the candidate translation is not learned, but is instead based on syntactic similarities between the source and the candidate translation. Because the optimal retrieved candidates should be the ones that can result in the best edited translation outcome, various methods described herein are focused on optimizing the retrieving step. In some examples, a domain-adaptable re-ranker may be used to re-rank the retrieved candidate translations (Algorithm 5—FIG. 4). The re-ranker may be based on the Labse embedding model (as shown in FIG. 4), but may be further fine-tuned using learning-to-rank with triplet ranking loss on the in-domain synthetic back translation dataset. Using the in-domain synthetic back translation dataset during training of the retriever 112 may optimize the embeddings for the target domain. For a given source sentence, the objective function aims at pushing up its embedding cosine similarity (or similarity determined using another similarity metric) with candidate translations that are syntactically closer to the ground truth target translation, so that most 'similar' candidate translation also requires the minimum editing efforts (measured as ChrF, Character n-gram F-score). During inference, (Algorithm 6—FIG. 8), k=top five candidate translations are retrieved based on the native Labse embedding similarity. The top five candidate translations are then re-ranked using the re-ranker. The top candidate translation (e.g., the candidate translation having the highest-ranked embedding data from among the top five candidate translations) may be concatenated with the source sentence for final translation generation.

Figures 7A, 7B:
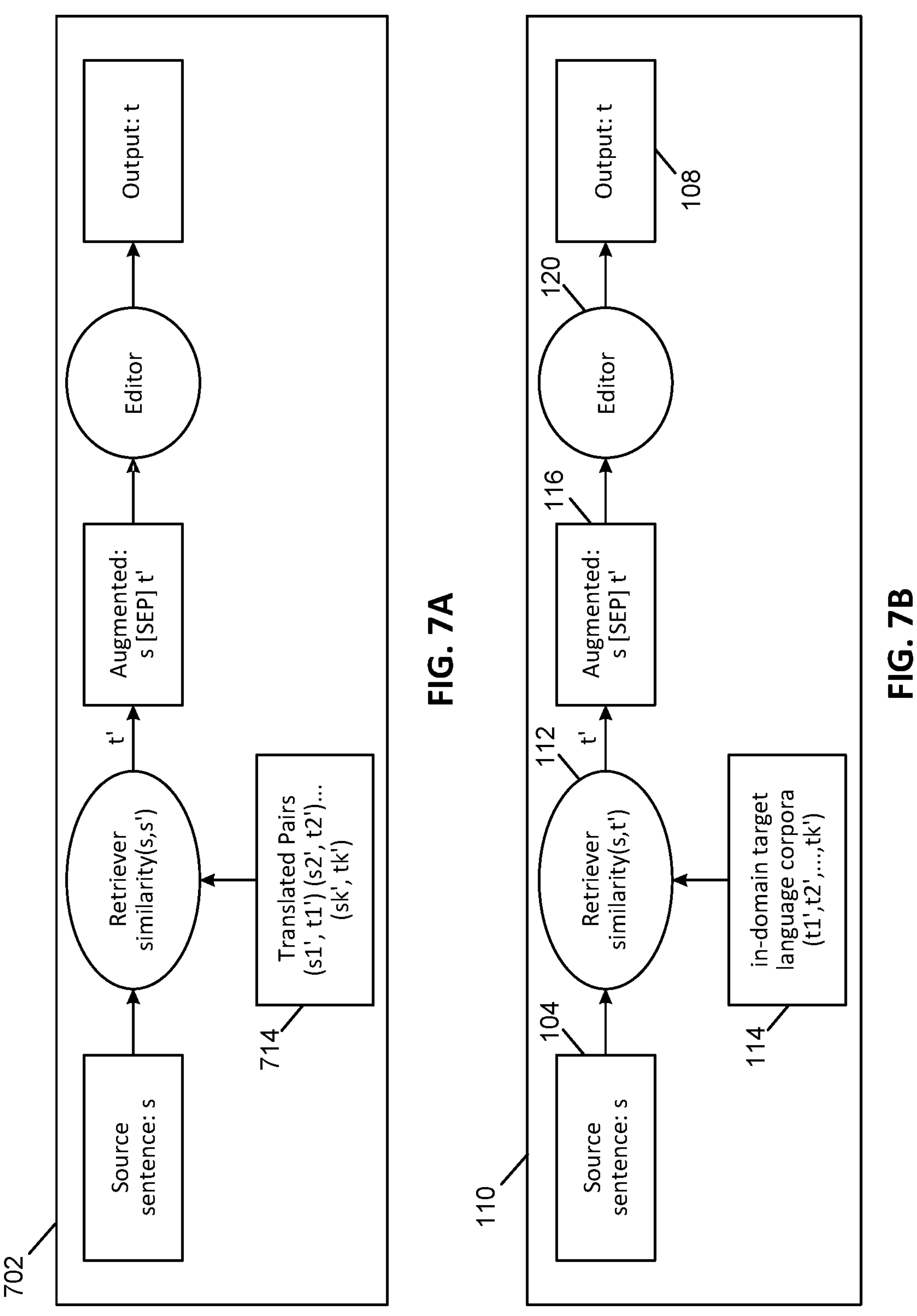
FIGS. 7A, 7B depict two different neural machine translation architectures, in accordance with various aspects of the present disclosure.

FIG. 7A depicts an example framework 702 for machine translation in which the candidate translation t' is selected based on the syntactic language features on the source language side (e.g., using fuzzy match or a similar syntactic similarity technique). Such frameworks may place resource constraints on the application of the framework, as the candidate pool 714 has to be paired sentences in source and target language. Such paired sentences (bitext) require human annotation/translation as described above. For contrast, FIG. 7B depicts the neural translation system 110. Neural translation system 110 uses only in-domain target language corpora 114 which does not need to be translated and/or human-annotated into sentence pairs.

The neural translation system 110 using, for example, Algorithms 1 & 2 can perform on-the-fly domain adaptation and output in-domain, high quality translation without additional model adaptation through training or human annotated in-domain data.

The neural translation system 110 is also designed to be extendable. It can continue to achieve better performance compared to its traditional counterpart when new machine learning resources becomes available. For resource-rich domain applications, the proposed algorithms (e.g., Algorithms 3 & 4) further improve the editor model 120 by augmenting a fine-tuning dataset with the back translation technique. Additionally, Algorithms 5 & 6 enables a domain-adaptable re-ranker to surface more domain-appropriate candidate translations (using retriever 112).

Figure 5:
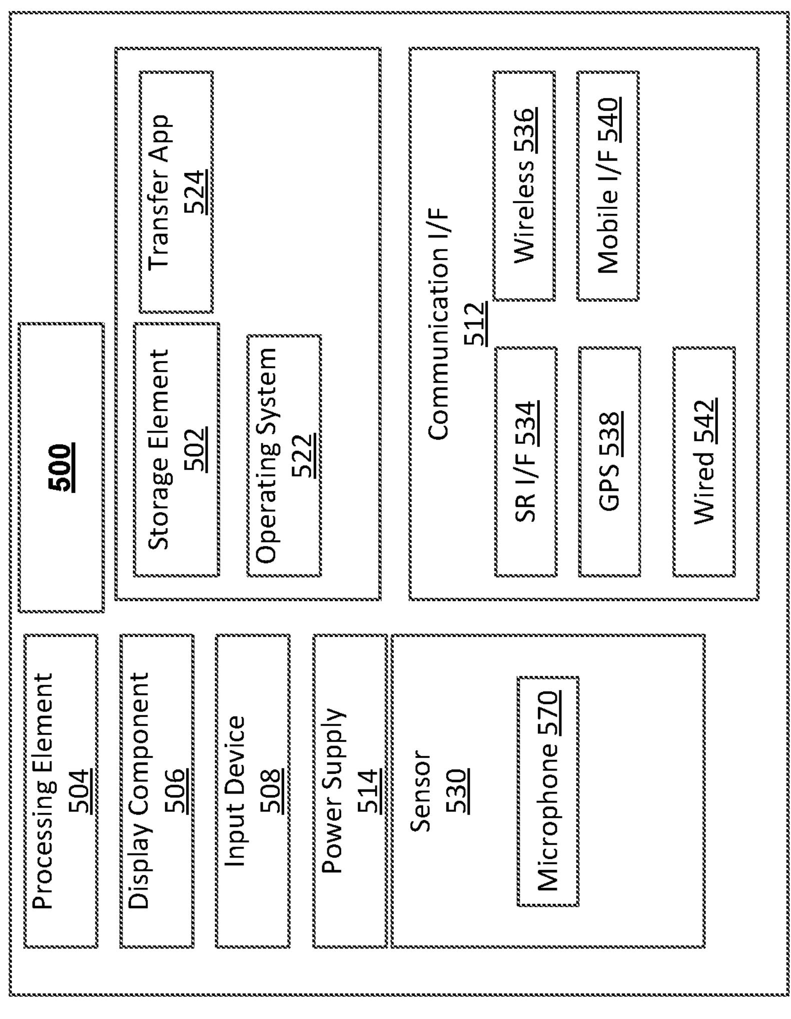
FIG. 5 is a block diagram showing an example architecture of a computing device that may be used in accordance with various embodiments described herein.

FIG. 5 is a block diagram showing an example architecture 500 of a computing device that may be used, at least in part, to provide translation systems as described herein, in accordance with various aspects of the present disclosure. It will be appreciated that not all devices will include all of the components of the architecture 500 and some user devices may include additional components not shown in the architecture 500. In an example embodiment, the architecture 500 includes one or more processing elements 504 for executing instructions and retrieving data stored in a storage element 502. The processing element 504 comprises at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. In an example embodiment, the storage element 502 comprises flash memory, random-access memory, disk-based storage, etc. Different portions of the storage element 502, for example, are used for program instructions for execution by the processing element 504, storage of images or other digital works, and/or a removable storage for transferring data to other devices, etc. Additionally, storage element 502 may store various costs, iterative penalty values a, and/or other values determined using the above-described techniques when updating the models and/or storing feature values.

The storage element 502 may also store software for execution by the processing element 504. An operating system 522 may provide the user with an interface for operating the computing device and may facilitate communications and commands between applications executing on the architecture 500 and various hardware thereof. In an example embodiment, a transfer application 524 is configured to receive images, audio, and/or video from another device (e.g., a mobile device, image capture device, and/or display device) and/or from microphone 570 included in the architecture 500.

When implemented in some user devices, the architecture 500 comprises a display component 506. The display component 506 can comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images and/or segmentation masks generated in accordance with the various techniques described herein.

The architecture 500 may also include one or more input devices 508 operable to receive inputs from a user. Example input devices 508 include a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

In an embodiment, the communication interface 512 comprises one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. In an embodiment, a short range interface 534 is configured to communicate using one or more short range wireless protocols such as, for example, near field communications (NFC), Bluetooth®, Bluetooth LE, etc. In an embodiment, a mobile interface 540 is configured to communicate utilizing a cellular or other mobile protocol. A Global Positioning System (GPS) interface 538 may be in communication with one or more earth-orbiting satellites or other suitable position-determining systems to identify a position of the architecture 500. In an embodiment, a wired communication module 542 is configured to communicate according to the USB protocol or any other suitable protocol.

The architecture 500 may also include one or more sensors 530 such as, for example, one or more position sensors, image sensors, and/or motion sensors. A microphone 570 is shown in FIG. 5, by way of example.

As noted above, multiple devices may be employed in a single system. In such a multi-device system, each of the devices may include different components for performing different aspects of the system's processing. The multiple devices may include overlapping components. The components of the translation systems, as described herein, are exemplary, and may be located as a stand-alone device or may be included, in whole or in part, as a component of a larger device or system.

Figure 6:
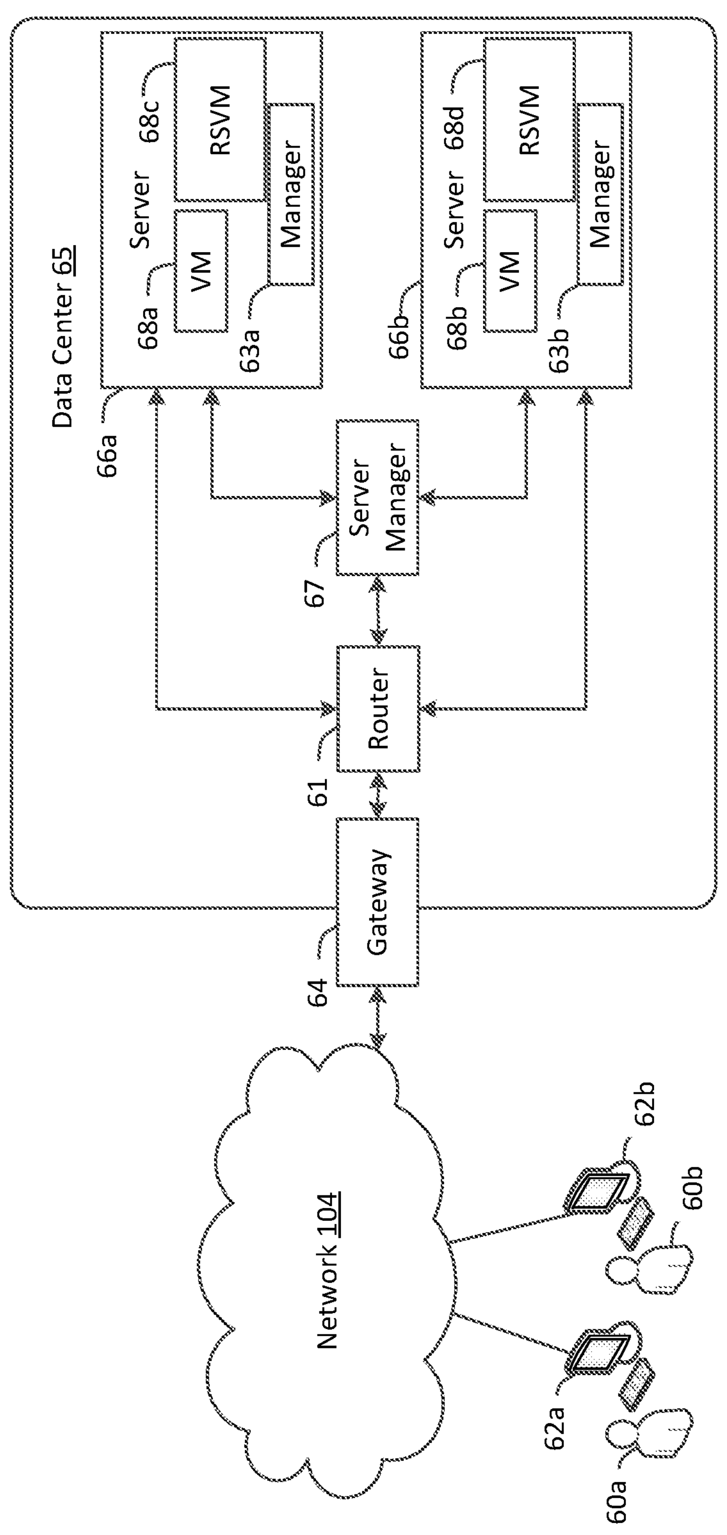
FIG. 6 is a diagram illustrating an example system for sending and providing data that may be used in accordance with the present disclosure.

An example system for sending and providing data and performing various computer processing techniques will now be described in detail. In particular, FIG. 6 illustrates an example computing environment in which the embodiments described herein may be implemented. For example, the computing environment of FIG. 6 may be used to provide translation systems as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the translation techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66*a* and 66*b* (which may be referred herein singularly as server 66 or in the plural as servers 66) that provide computing resources. These resources may be available as bare metal resources or as virtual machine instances 68*a-d* (which may be referred herein singularly as virtual machine instance 68 or in the plural as virtual machine instances 68). In at least some examples, server manager 67 may control operation of and/or maintain servers 66. Virtual machine instances 68*c* and 68*d* are rendition switching virtual machine ("RSVM") instances. The RSVM virtual machine instances 68*c* and 68*d* may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and enabling computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62*a* or 62*b* may be a server, a desktop or laptop personal computer, a tablet computer, a wireless telephone, a personal digital assistant (PDA), an e-book reader, a game console, a set-top box or any other computing device capable of accessing data center 65. User computer 62*a* or 62*b* may connect directly to the Internet (e.g., via a cable modem or a Digital Subscriber Line (DSL)). Although only two user computers 62*a* and 62*b* are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63*a* or 63*b* (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66*a* and 66*b*. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66*a* and 66*b*. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution systems (such as application server instances, Java™ virtual machines (JVMs), general-purpose or special-purpose operating systems, systems that support various interpreted or compiled programming languages such as Ruby, Perl, Python, C, C++ and the like or high-performance computing systems) suitable for the applications, without, for example, requiring the client to access an instance or an execution platform directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

Figure 9:
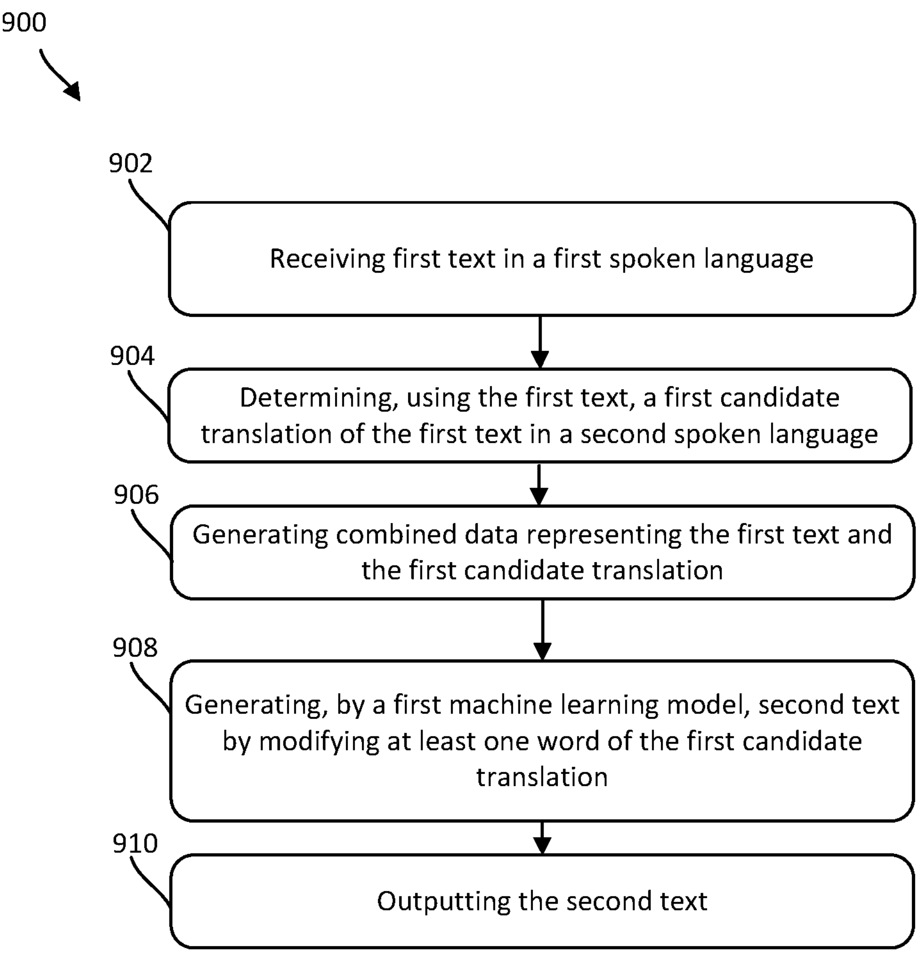
FIG. 9 is a flowchart illustrating an example process for computer-translation of natural language data, in accordance with various aspects of the present disclosure.

FIG. 9 is a flow chart illustrating an example process 900 for providing computer translation of natural language data, in accordance with various embodiments of the present disclosure. Those actions in FIG. 9 that have been previously described in reference to FIGS. 1-8 may not be described again herein for purposes of clarity and brevity. The actions of the process depicted in the flow diagram of FIG. 9 may represent a series of instructions comprising computer-readable machine code executable by one or more processing units of one or more computing devices. In various examples, the computer-readable machine code may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 900 of FIG. 9 may begin at action 902, at which first text in a first spoken language may be received. The first text may represent the source text (e.g., source sentence s). In various examples, the first text may be processed to determine an embedding (e.g., a numerical representation of the semantic meaning of the first text). For example, retriever 112 (and/or a pre-processing stage) may generate a cross-lingual sentence transformer embedding, as described above.

Processing may continue at action 904, at which a first candidate translation of the first text in a second spoken language may be determined. As described above, the retriever may determine the most semantically similar candidate translation from among a corpus of in-domain target language corpora 114. For example, the retriever may use a similarity search in the Faiss framework by determining a similarity (e.g., cosine similarity) between cross-lingual sentence transformer embeddings between the input source embedding and the embeddings representing candidate translations in the in-domain target language corpora 114.

Processing may continue at action 906, at which combined data representing the first text and the retrieved first candidate translation may be generated. In various examples, the source embedding and the candidate target embedding may be concatenated using a [SEP] token to separate the source embedding from the candidate target embedding.

Processing may continue at action 908, at which a first machine learning model may generate second text by modifying at least one word of the first candidate translation. As described above, the editor model 120 may be a transformer-based model that may learn to edit candidate translations using general-domain bitext data. In various examples, the back-translation techniques of Algorithms 3 & 4 may be used to adapt the editor model 120 to the domain of interest. After editing, the second text may represent an accurate translation of the source text in a target language. Processing may continue at action 910, at which the second text may be output (e.g., on a display as text and/or as audio (via text-to-speech processing)).

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of language translation, comprising:

determining first text comprising at least one word composed in a first spoken language;

generating first embedding data representing the first text;

selecting second embedding data stored in non-transitory computer-readable memory based on a similarity between the first embedding data and the second embedding data, the second embedding data representing second text comprising at least one word composed in a second spoken language, wherein the second text is a candidate translation of the first text in the second spoken language;

generating first combined data by combining the first text and the second text;

inputting the first combined data into a transformer model trained to edit the candidate translation in the second text using the first text;

generating, by the transformer model using the first combined data, third text by altering at least one word of the second text, wherein the third text is a corrected translation of the first text in the second spoken language; and outputting the third text.

2. The computer-implemented method of claim 1, further comprising:

determining the second embedding data from among a pool of candidate embedding data stored in the non-transitory computer-readable memory, wherein the pool of candidate embedding data represents a plurality of sentences in the second spoken language related to a first domain.

3. The computer-implemented method of claim 1, further comprising:

generating, using a neural machine translation system, a first translation of the second text, the first translation being text in the first spoken language;

generating third embedding data representing the first translation;

determining fourth embedding data stored in the non-transitory computer-readable memory based on a similarity between the third embedding data and the fourth embedding data, the fourth embedding data representing fourth text in the second spoken language, wherein the fourth text is a candidate translation of the first translation in the second spoken language;

generating second combined data by combining the third embedding data and the fourth embedding data;

inputting the second combined data into the transformer model;

generating, by the transformer model, fifth text by altering at least one word of the fourth text;

determining a loss representing a difference between the fifth text and the second text; and updating at least one parameter of the transformer model based at least in part on the loss.

4. A method comprising:

receiving, by at least one computing device, first text in a first spoken language;

selecting, based at least in part on the first text, a first candidate translation of the first text in a second spoken language selected from among a candidate pool of text associated with a first domain;

generating combined data representing the first text and the first candidate translation;

generating, by a first machine learning model using the combined data, second text by modifying at least one word of the first candidate translation based at least in part on the first text; and outputting, by the at least one computing device, the second text.

5. The method of claim 4, wherein the candidate pool of text in the second spoken language represents untranslated text in the second spoken language.

6. The method of claim 4, further comprising:

generating first token data representing an embedding of the first text; and determining a similarity between the first token data and second token data representing the first candidate translation using a first similarity metric.

7. The method of claim 6, further comprising generating the combined data by combining the first token data and the second token data separated by a [SEP] token.

8. The method of claim 4, further comprising:

generating a first training sample at least in part by back-translating the first candidate translation into the first spoken language to generate third text; and determining a second candidate translation of the third text in the second spoken language.

9. The method of claim 8, further comprising:

generating, by the first machine learning model, fourth text by modifying at least one word of the second candidate translation;

determining a first loss based at least in part on a difference between the fourth text and the first candidate translation; and updating at least one parameter of the first machine learning model based at least in part on the first loss.

10. The method of claim 4, further comprising:

generating first embedding data representing the first text, wherein the first embedding data is non-domain specific;

determining a list of embedding data based at least in part on respective first similarities between the first embedding data and each embedding data of the list of embedding data;

generating second embedding data representing the first text, wherein the second embedding data is optimized for the first domain;

ranking the list of embedding data based at least in part on respective second similarities between the second embedding data and each embedding data of the list of embedding data; and selecting a highest-ranked embedding data of the list of embedding data as the first candidate translation.

11. The method of claim 4, wherein modifying the at least one word of the first candidate translation comprises replacing a first word of the second text with a second word.

12. The method of claim 4, further comprising:

receiving a selection of the first domain describing a first topic;

receiving, by the at least one computing device, third text in the first spoken language;

determining a first corpus of untranslated sentences in the second spoken language that correspond to the first domain; and determining, based at least in part on the third text, a second candidate translation of the first text in the second spoken language, wherein the second candidate translation is determined from among the first corpus of untranslated sentences.

13. A system comprising:

at least one processor; and at least one non-transitory computer-readable memory storing instructions that, when executed by the at least one processor, are effective to:

receive, by at least one computing device, first text in a first spoken language;

select, based at least in part on the first text, a first candidate translation of the first text in a second spoken language selected from among a candidate pool of text associated with a first domain;

generate combined data representing the first text and the first candidate translation;

generate, by a first machine learning model using the combined data, second text by modifying at least one word of the first candidate translation based at least in part on the first text; and output, by the at least one computing device, the second text.

14. The system of claim 13, wherein the candidate pool of text in the second spoken language represents untranslated text in the second spoken language.

15. The system of claim 13, the at least one non-transitory computer-readable memory storing further instructions that, when executed by the at least one processor, are further effective to:

generate first token data representing an embedding of the first text; and determine a similarity between the first token data and second token data representing the first candidate translation using a first similarity metric.

16. The system of claim 15, the at least one non-transitory computer-readable memory storing further instructions that, when executed by the at least one processor, are further effective to:

generate the combined data by combining the first token data and the second token data separated by a [SEP] token.

17. The system of claim 13, the at least one non-transitory computer-readable memory storing further instructions that, when executed by the at least one processor, are further effective to:

generate a first training sample at least in part by back-translating the first candidate translation into the first spoken language to generate third text; and determine a second candidate translation of the third text in the second spoken language.

18. The system of claim 17, the at least one non-transitory computer-readable memory storing further instructions that, when executed by the at least one processor, are further effective to:

generate, by the first machine learning model, fourth text by modifying at least one word of the second candidate translation;

determine a first loss based at least in part on a difference between the fourth text and the first candidate translation; and update at least one parameter of the first machine learning model based at least in part on the first loss.

19. The system of claim 13, the at least one non-transitory computer-readable memory storing further instructions that, when executed by the at least one processor, are further effective to:

generate first embedding data representing the first text, wherein the first embedding data is non-domain specific;

determine a list of embedding data based at least in part on respective first similarities between the first embedding data and each embedding data of the list of embedding data;

generate second embedding data representing the first text, wherein the second embedding data is optimized for the first domain;

rank the list of embedding data based at least in part on respective second similarities between the second embedding data and each embedding data of the list of embedding data; and select a highest-ranked embedding data of the list of embedding data as the first candidate translation.

20. The system of claim 13, wherein modifying the at least one word of the first candidate translation comprises replacing a first word of the second text with a second word.

* * * * *